Patented Aug. 12, 1924.

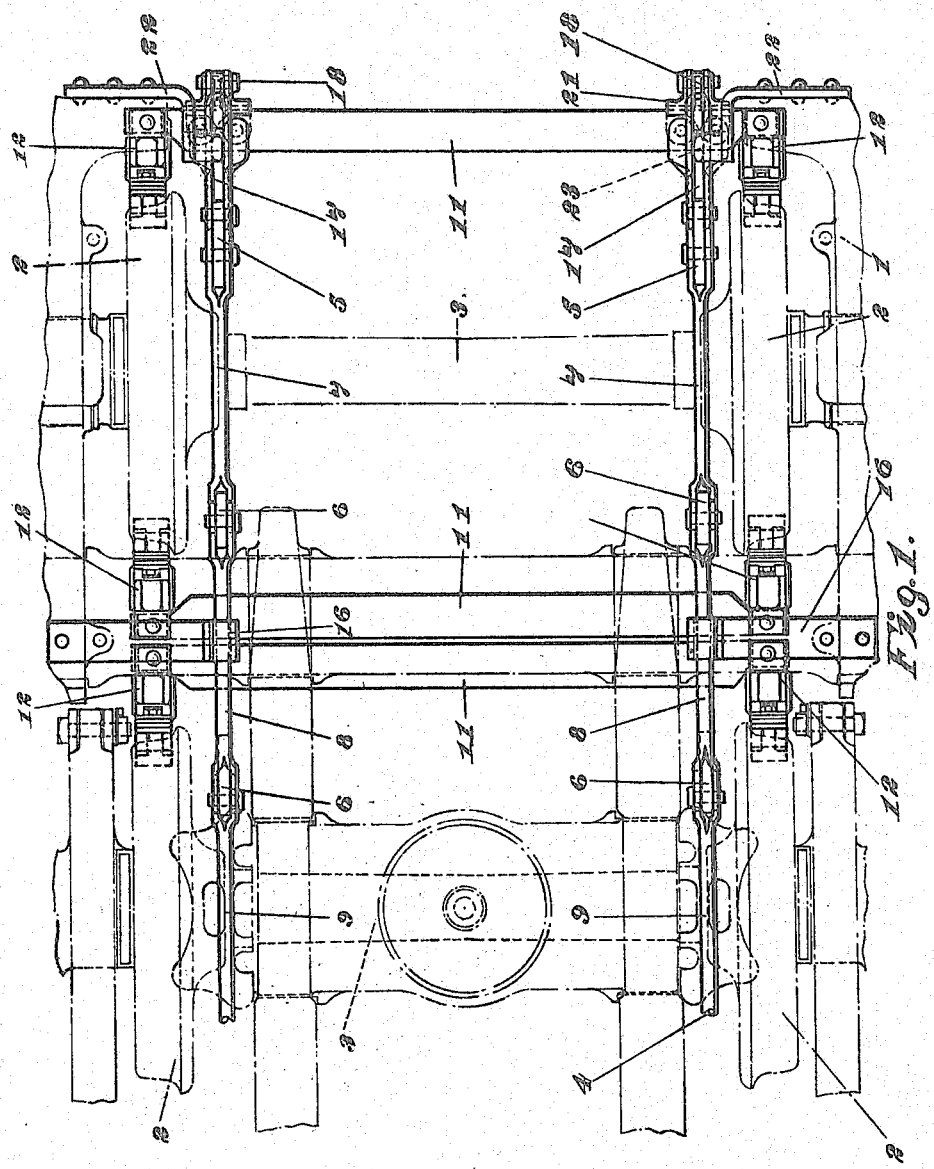

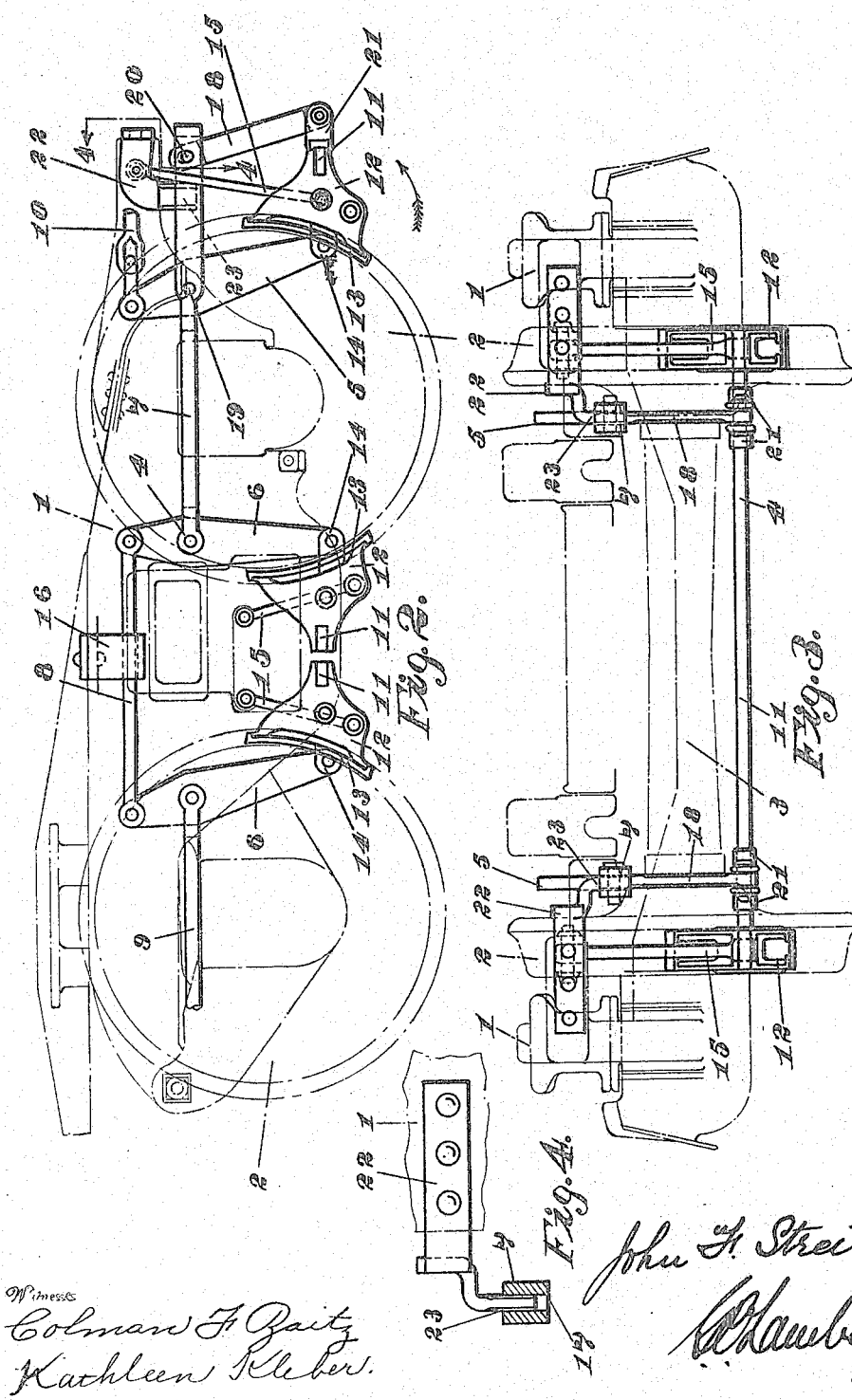

1,504,281

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

Application filed August 8, 1923. Serial No. 656,403.

*To all whom it may concern:*

Be it known that I, JOHN F. STREIB, a citizen of the United States, residing in Avalon, in the county of Allegheny and State of Pennsylvania, have invented certain new and useful Improvements in Brake Mechanism, of which the following is a specification.

This invention relates to railway truck brakes and has for an object the provision of means for maintaining a brake beam substantially level when the braking power is released to prevent the brake shoes attached to the beam from dragging on the wheels.

Another object of the invention is to provide means between a brake beam and a brake rod adapted to maintain a brake beam substantially level when the braking power is released and to permit the beam to tilt when the braking power is being applied and also adapted to permit the brake rod, to which it is connected, to move vertically relative thereto, when the braking power is being applied, thus preventing undue strains from coming upon the rod or other parts of the mechanism when the brake is being operated.

A further object of the invention is to provide a simple and efficient means for supporting or guiding a brake rod.

These and other objects will be apparent from the following description:

Referring to the drawings in which like reference characters refer to like parts, Fig. 1 is a plan view of a portion of a brake embodying the invention, a portion of the truck being illustrated in dot and dash lines; Fig. 2 is a side elevational view of the same; Fig. 3 is an end elevational view of the same and Fig. 4 is an enlarged sectional view taken on the line 4—4 of Fig. 2.

Referring now in detail to the drawings, the reference character 1 indicates the truck frame which may be of any suitable form or construction and 2 the truck wheels which are mounted on axles 3 which are rotatably mounted in suitable axle boxes mounted in the truck frame.

The reference character 4 indicates the brake which preferably comprises two sets of connected levers and rods, one set being arranged at each side of the truck. Each of these sets comprises a lever 5 which is arranged adjacent one side of the end wheel of the truck and a lever 6 which is arranged adjacent the opposite side of the same wheel, which levers, intermediate their ends are connected by a longitudinally disposed rod 7. The upper end portion of the lever 6 is connected with the upper end portion on a similar lever 6 arranged adjacent one side of an adjacent wheel by a rod 8. Adjacent the opposite side of this wheel another lever 6 (not shown) is arranged. Intermediate their ends these last mentioned levers 6 are connected through the medium of a rod 9. The upper ends of the lever 5 are connected with pull rods 10 which rods may be connected with the usual equalizing mechanism (not shown).

At each side of each pair of wheels a brake beam 11 is provided which extends transversely of the truck and at its ends is provided with brake heads 12 which in turn are provided with shoes 13 adapted to engage the tread of the wheel when the braking power is applied. At their lower ends, each of the brake levers is connected with one of the brake beams 11 preferably through the medium of a member 14 which is rigidly secured to the brake beam and pivotally connected with the brake lever.

The brake beams are supported from the truck frame by means of hangers 15 each of which at one end is pivotally connected with the truck frame and at the opposite end is connected with one of the brake heads. To support the levers 6 and rod 8 connecting them, a bracket 16 is provided which is secured to the truck frame and extends inwardly therefrom and upon this bracket the rod 8 is adapted to rest.

Each of the rods 7 is extended some distance outwardly beyond the lever 5 and is preferably provided with a slot or jaw 17 into which the lever 5 and the upper end of a member 18 preferably extend and this lever and member are pivotally connected with the rod by means of pins 19 and 20 respectively. Adjacent its lower end this member is pivotally connected with brackets 21 which are attached to the brake beam. The opening in the member 18 through which the pin 20 passes is made of slotted form and this is done for the purpose of permitting the rod 7 to move upwardly relative to the member 18 when the braking power is being applied, and also to permit the beam to tilt slightly, so that the entire faces of the shoes will engage the treads of the wheels evenly without causing any undue strain to come upon the rod 7 or other parts of the mechanism. When the braking power is released the parts of the brake disposed at one side of the beam will, due to their weight, have a tendency to rotate the beam and connected parts in the direction as indicated by the arrow in Fig. 2 and this movement, before it becomes excessive, i. e., before the shoe drags on the wheel, is resisted by the member 18 engaging the pin 20, thus holding the beam substantially level.

To support or guide the rods 7, members 22 are provided which are secured to the truck frame and are preferably provided downwardly depending portions 23 which extend into the slots or jaws 17 of the rods 7 such rods being movable longitudinally relative to the portions 23. It will thus be seen that the members 22 will prevent the rods and levers from moving in a direction transversely of the truck and at the same time permit the free movement of such parts in a direction longitudinally of the truck.

The term "level" as used in connection with the brake beam in the foregoing description and appended claims, is intended to mean the maintaining or holding of the brake beam in its initial position against tilting when the brake is in released position, whether it be disposed in a horizontal plane, or at an angle thereto.

It will be apparent to those skilled in the art to which this invention appertains that many minor changes may be made in the construction and arrangement of the parts forming the invention without departing from the spirit and scope of the appended claims.

Having thus described the invention, what I claim as new and desire to secure by Letters Patent is:—

1. In a brake mechanism, the combination with the wheels of a car truck, of a brake beam, a brake rod, shoes on said beam adapted to be moved into and out of engagement with said wheels, and means connected with said rod and beam for maintaining said beam level when said shoes are out of engagement with said wheels, said means permitting said beam to tilt as said shoes engage said wheels.

2. In a brake mechanism, the combination with the wheels of a car truck, of a brake beam, a brake rod, shoes on said beam adapted to be moved into and out of engagement with said wheels and means connected with said rod and beam for maintaining said beam level when said shoes are out of engagement with said wheels, said means embodying a loose connection whereby said beam may tilt when said shoes engage said wheels.

3. In a brake mechanism, a brake beam, a brake rod, and means for maintaining said beam level when the brake is released, said means being connected with said rod and adapted to permit relative movement between said rod and beam when the braking power is being applied.

4. In a brake mechanism, a brake beam, a brake rod, and means connected with said beam and rod adapted to maintain said beam level when the brake is in released position, said means being adapted to permit relative movement between said rod and beam when the braking power is being applied.

5. In a brake mechanism, a brake beam, a brake rod, and means connected with said beam and rod adapted to maintain said beam level in its released position, said means permitting independent movement between said beam and rod when the braking power is being applied.

6. In a brake mechanism, a brake beam, a brake rod, a member connected with said beam and rod adapted to maintain said beam level in its released position, and means whereby relative vertical movement between said rod and beam is permitted.

7. In a brake mechanism, a brake beam, a brake rod, a member connected with said beam and rod adapted to maintain said beam level in its released position, and means whereby vertical movement of said members and rod are permitted when the braking power is being applied.

8. In a brake mechanism, a brake beam, a brake rod, a member connected with said beam and rod adapted to maintain said beam level, said member being slidably connected with said rod.

9. In a brake mechanism, a brake beam, a brake rod and a member extending between said beam and rod, one end of said member being pivotally connected with said beam and the opposite end being slidably connected with said rod.

10. In a brake mechanism, a brake beam, a brake rod, a member extending between said beam and rod and connected therewith, and means whereby relative vertical movement is permitted between said rod and member.

11. In a brake mechanism, a brake beam, a brake rod, a member connected with said beam and rod, and means whereby said beam may move upwardly or downwardly relative to said rod.

12. In a brake mechanism, a brake beam, a brake rod, a member connected with said beam and rod, and means whereby said rod may move upwardly or downwardly relative to said beam.

13. In a brake mechanism, a brake beam, a brake rod, a member for maintaining said beam level when said beam is in its released position and a slotted connection between said rod and member whereby independent movement of said rod and member is permitted when the braking power is being applied.

14. In a brake mechanism, a brake beam, a brake rod, a brake lever connected with said beam and rod, a member connected with said beam and rod and spaced away from said lever and means whereby said rod and beam are movable upwardly and downwardly relative to each other.

15. In a brake mechanism, a brake beam, a brake lever connected with said beam, a rod connected with said lever and extending therebeyond, a member connected with said beam, and a slotted connection between said member and the extension of said rod.

16. In a brake mechanism, a brake beam, a brake lever connected with said beam, a brake rod connected with said lever and extending therebeyond, a member connected with said beam, and a guide engaging the extension of said rod between said member and lever.

17. In a brake mechanism, a brake beam, a brake lever connected with said beam, a brake rod connected with and extending beyond said lever, and a fixed guide member adapted to engage said extension.

18. In a brake mechanism, a brake lever, a rod connected with said lever, an extension on said rod and stationary guiding means adapted to engage said extension.

19. In a brake mechanism, a brake lever, a brake rod connected with said lever an extension on said lever, and stationary means engaging said extension for guiding said rod and permitting said rod to slide relative to said means.

20. In a brake mechanism, a brake lever, a brake rod connected with said lever, an extension on said rod, having an opening formed therein and means extending into said opening for guiding said rod.

21. In a brake mechanism, a brake beam, a brake rod, a brake lever connected with said beam and rod, a supporting member for said beam connected with said beam and rod, said lever and member being spaced apart and extending substantially parallel with each other, and a guide member adapted to engage said rod between said lever and member.

In testimony whereof I affix my signature in the presence of two witnesses.

JOHN F. STREIB.

Witnesses:
COLMAN F. ZAITZ,
KATHLEEN KLEBER.